May 30, 1950     M. PEGARD     2,509,696
TAPPING BOX
Filed Dec. 10, 1945
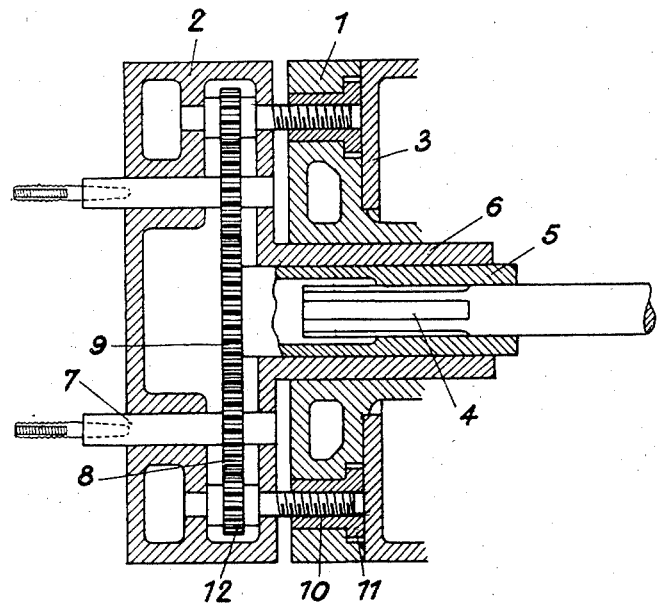
Inventor
Marcel Pegard
By Patented May 30, 1950

2,509,696

UNITED STATES PATENT OFFICE 2,509,696

TAPPING BOX

Marcel Pégard, Paris, France, assignor to Société Ateliers G. S. P., Guillemin, Sergot, Pégard, Paris, France Application December 10, 1945, Serial No. 634,066
In France February 28, 1945

1 Claim. (Cl. 10—130)

The present invention has for its object a tapping box for the simultaneous execution of any number of inner or outer tappings or screw cuttings.

Said apparatus is chiefly characterised by the fact that the displacement of the box is controlled by one or more leading screws the rotary movement of which is taken from the movement controlling the tool carrying spindles. The connecting gears between the spindles and the leading screw are designed in a manner such that it is possible to obtain for each revolution of the tool a displacement which is equal to the pitch to be obtained.

According to a further feature of the improved box, it is possible within certain limits to obtain through the mounting of suitable gears between the spindles and the leading screws the simultaneous cutting of threads of different diameters and pitches.

A particular form of execution of such a tapping box is described hereinafter by way of example and by no means in a limitative sense and is illustrated in accompanying drawing. The single figure of said drawing is an axial cross-section of a device according to my invention.

The apparatus includes two parts 1 and 2 adapted to move one with reference to the other. The part 1 is a support adapted to be secured to the head 3 of the machine including a controlled shaft not shown adapted to rotate at a predetermined speed, for instance a boring or drilling head. To this control shaft is operatively coupled a spindle 4 to which is slidingly keyed a socket 5. This socket is centered and axially secured inside a sleeve 6 rigid with the part 2 forming the box proper. The latter contains the tool carriers 7 to which is impressed a rotary movement through the agency of pinions 8 meshing with a central pinion 9 keyed to the socket 5.

The two parts 1 and 2 are connected through screws 10 secured inside nuts 11 rigid with the stationary member 1; these screws are actuated by pinions 12 meshing with the pinions 8.

It is thus apparent that when the controlled shaft in the head 3 is caused to rotate, it drives the socket 5, and the pinion 9 which produces the rotation on one hand of the tool carriers 7 and on the other of the screws 10 which produces the desired advance. It is thus possible to simultaneously provide a plurality of tappings or screw cuttings of any diameter. By suitably choosing the gear ratios, it is possible to obtain the required pitches which may be different from one tapping to the other.

Supposing P is the pitch of the screw 10, $p$ the pitch of the tapping or thread to be obtained, the ratio of the gear to be inserted between the tool carrier and the screw is $p/P$.

The above described arrangements illustrated in accompanying drawings are given out solely by way of examples and the shapes, sizes, and material used may be modified according to the case without changing the principle of the invention.

What I claim is:

A multiple drilling device adapted to be secured to a machine tool, comprising a stationary part adapted to be directly secured to the machine tool, a part adapted to be longitudinally moved with reference to the stationary part along a rectilinear path, a plurality of cutting tools rotatably carried by the movable part, a common driving member, a common central pinion controlled by said driving member and rotatably carried by the movable part, gear wheels engaging said common pinion and adapted to control mechanically the different tools carried by the movable part, further gears engaging last mentioned gear wheels, a plurality of nuts rigid with the stationary part, threaded rods cooperating with the different nuts, rotatably carried by the movable part and operatively connected with the last mentioned gears independently of the central pinion.

MARCEL PÉGARD.

REFERENCES CITED

The following references are of record in the file of this patent:

UNITED STATES PATENTS

| Number | Name | Date |
|---|---|---|
| 934,776 | Vosper | Sept. 21, 1909 |
| 1,135,974 | Wetsel | Apr. 13, 1915 |

FOREIGN PATENTS

| Number | Country | Date |
|---|---|---|
| 154,376 | Germany | Sept. 21, 1904 |